Dec. 3, 1968  B. F. GILBREATH  3,414,738

SERIALLY CONNECTED SCR CIRCUIT FOR SWITCHING AC POWER TO A LOAD

Filed June 30, 1965

INVENTOR
Benjamin F. Gilbreath

BY

ATTORNEY

United States Patent Office 3,414,738
Patented Dec. 3, 1968

1

3,414,738
SERIALLY CONNECTED SCR CIRCUIT FOR
SWITCHING AC POWER TO A LOAD
Benjamin F. Gilbreath, Richardson, Tex., assignor to
Texas Instruments Incorporated, Dallas, Tex., a corporation of Delaware
Filed June 30, 1965, Ser. No. 468,197
8 Claims. (Cl. 307—252)

ABSTRACT OF THE DISCLOSURE

A gated switching circuit for supplying a limited number of pulses of electrical power to a load, including an alternating power source, a load, a first rectifier, a second rectifier and a gated switch, all serially connected with means for providing to the switch a gating current and a holding current.

---

Figure 1:
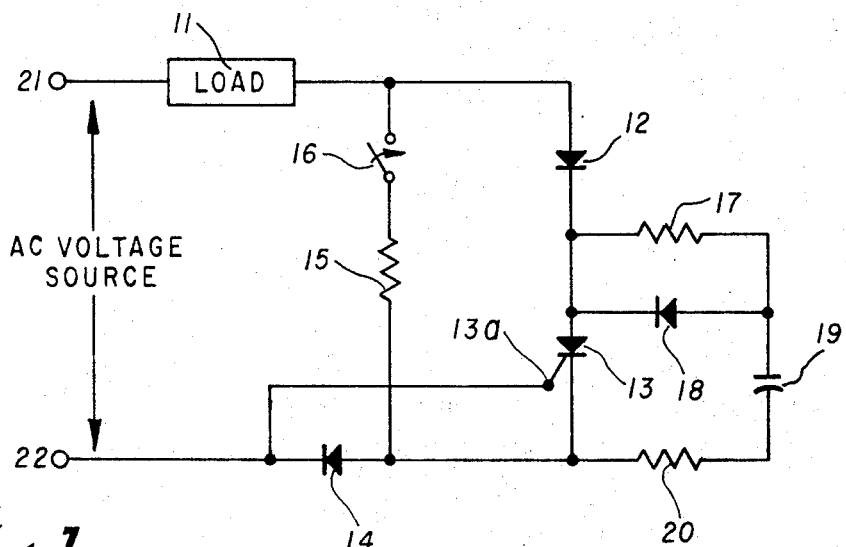

This invention relates generally to electric circuits, and in particular, to a gated switch circuit.

In the operation of some electrical devices from alternating current power sources, such as portable impact equipment, for example, it is often desirable to provide a limited number of pulses of power. To accomplish this, a switch means is required which will conduct for a predetermined number of cycles after receiving a gating signal. After the period of conduction, the switch must automatically open and remain nonconducting until the gating signal is removed and re-applied.

Accordingly, an object of this invention is to provide a means for supplying a limited number of pulses of electrical power to a load.

Another object of the invention is to provide a switch circuit that will conduct an alternating current unidirectionally for a predetermined number of cycles after receiving a gating signal, and will not conduct again until the gating signal is removed and re-applied.

Still another object of the invention is to provide a simple and rugged switch circuit especially suited for use in portable electrical impact equipment.

Figure 2:
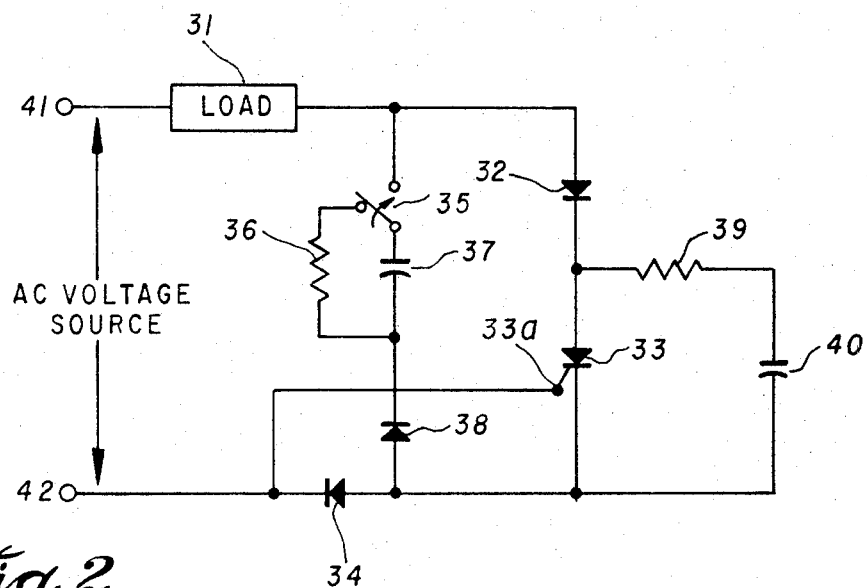

These and other objects and features of the invention will become more readily understood from the following description and appended claims when read in conjunction with the drawing, in which:

FIGURE 1 is a schematic diagram of an electrical circuit embodying the novel features of the invention, and FIGURE 2 is a schematic diagram of another electrical circuit embodying the novel features of the invention.

In accordance with the invention, a gated switch is serially connected with a load across an AC power source. Means is provided for applying a gating pulse to the switch. Means is also provided whereby the switch remains in the conducting state for a predetermined number of cycles and then automatically opens. The gating pulse must then be removed and re-applied before the switch can again change to the conducting state.

Referring now to FIGURE 1, a controlled rectifier is utilized as the gated switch. A controlled rectifier conducts in a forward direction only after a small signal is applied to its gate, and remains in the conducting state so long as a minimum current, called the holding current, is maintained through the device. In FIGURE 1, a load 11 is serially connected with a power rectifier 12, a controlled rectifier 13 (having gate 13a), and a power rectifier 14 across the AC power terminals 21, 22. Shunting the rectifier 12 and the controlled rectifier 13 is a manually operated switch 16 and the serially connected resistor 15. The diode 18, shunted by the resistor 17, is serially connected with the capacitor 19 and the resistor 20, the combination shunting the controlled rectifier 13.

2

The arrangement of rectifier 12, controlled rectifier 13, and rectifier 14 is such that load current can flow through the load 11 only when the terminal 21 is positive and controlled rectifier 13 is in the conducting state. The controlled rectifier 13 cannot go from a blocking state to a conducting state so long as the switch 16 is open since no gating current can flow through the gate electrode 13a. With the positive half-cycles of voltage present on terminal 21, capacitor 19 charges to peak line voltage through the load 11, rectifier 12, resistor 17, capacitor 19, resistor 20, and the rectifier 14. Compared to the normal load current, this charging current is negligible because the resistor 17 has a high resistive value in comparison to the load 11. The rectifier 12 prevents discharging of the capacitor 19 when the negative half-cycles of voltage are on the terminal 21.

When the switch 16 is closed and a positive half-cycle of voltage appears on terminal 21, a small current flows through the load 11, switch 16, resistor 15, and rectifier 14 (again, this current being negligible in comparison to the normal load current because of the high resistance of resistor 15). This conduction does not affect the blocking state of the controlled rectifier 13 since no current flows through the gate electrode 13a.

With a negative half-cycle of voltage on terminal 21 and the switch 16 closed, current flows through the gate 13a, resistor 15, switch 16, and load 11. This current fires the controlled rectifier 13 and allows the capacitor 19 to discharge through the diode 18, the controlled rectifier 13, and the resistor 20. The discharge current of the capacitor 19 will maintain the conducting state of controlled rectifier 13 so long as the discharge current is larger than the holding current for the controlled rectifier. By the proper selection of capacitor 19 and resistor 20, the discharge current can maintain the conducting state of the controlled rectifier 13 for one or more cycles of voltage, thus allowing a load current to pass through the load 11 for one or more half-cycles of voltage.

In one construction of the embodiment of the invention illustrated in FIGURE 1, designed to provide a single half-cycle of voltage from a 60 cycle, 120 volt source to a low resistance load 11 (such as an electrical hammer), the following component values are used:

| | | |
|---|---|---|
| Resistor 15 | ohms | 8.2K |
| Resistor 17 | do | 15K |
| Resistor 20 | do | 2.7K |
| Capacitor 19 | microfarads | 2 |

The holding current for the controlled rectifier 13 is between 3 and 6 milliamperes. When the capacitor 19 is charged to peak line voltage and switch 16 is closed, the discharge of the capacitor through the controlled rectifier 13 provides a holding current through the controlled rectifier for longer than 8.3 milliseconds, or the period of one half-cycle. Thus, the capacitor can discharge through the controlled rectifier 13 during a negative half-cycle and still provide sufficient holding current to maintain the conducting state of the controlled rectifier at the beginning of the next positive half-cycle. In the positive half-cycle, capacitor 19 continues discharging and load current flows through the load 11, the rectifier 12, the controlled rectifier 13 and the rectifier 14. In the next negative half-cycle, the rectifier 12 blocks loads current. Gate current is again applied to the controlled rectifier 13, but the capacitor 19 does not have sufficient charge to maintain a holding current. Thus, load current will not again flow since the controlled rectifier is not in a conducting state for the following positive half-cycle. The switch 16 must be opened to remove the gating current from the controlled rectifier during the negative half-cycles. The capacitor 19 can then recharge to peak line voltage. By increasing the capacitance of capacitor 19 and adjusting the ohmic values of resistor 17 and resistor 20, a load current for two or more positive half-cycles can be provided with each closing of the switch 16.

FIGURE 2 illustrates another embodiment of the invention designed to provide a single half-cycle of voltage from a 60 cycle, 120 volt source to the load 31. Again, the load 31 is serially connected to a power rectifier 32, a controlled rectifier 33 and a power rectifier 34. The rectifier 32 and controlled rectifier 33 are shunted by a switch 35 serially connected to capacitor 37 and a diode 38. The switch 35 has one position in which the capacitor 37 is shunted by a resistor 36. The resistor 39 and the serially connected capacitor 40 shunt the controlled rectifier 33. With the switch 35 open and the controlled rectifier in a blocking state, no load current can flow. The capacitor 40 will charge to peak line voltage through the rectifier 32 and the resistor 39. If the switch 35 is closed (contacting the load line) when the terminal 41 has positive voltage, no gate current flows because of the blocking diode 38. After the voltage on terminal 41 becomes negative, a gate current does flow through the gate electrode 33a of the controlled rectifier 33 and charges the capacitor 37. This gating circuit may be traced from terminal 42 through the gate electrode 33a, diode 38, capacitor 37, switch 35 and load 31 to terminal 41. The gate current fires the controlled rectifier 33 and allows the capacitor 40 to discharge through the resistor 39 and the controlled rectifier 33. The discharge current maintains a holding current for more than 8.3 milliseconds, or during the negative half-cycle of voltage on terminal 41, and the controlled rectifier is in a conducting state at the beginning of the following positive half-cycle. During the positive half-cycle, or terminal 41, a load current flows through the load 31, the rectifier 32, the controlled rectifier 33 and the rectifier 34. In the next negative half-cycle of voltage on terminal 41, the rectifiers 32, 33 and 34 block load current. The capacitor 40, having discharged during the preceding two half-cycles, does not have enough charge to maintain a holding current through the controlled rectifier 33. Consequently, the controlled rectifier 33 reverts to the blocking state. Although the switch 35 is still closed, no gating current can flow because the capacitor 37 retains the charge built up from the first gating current and thus blocks any subsequent gating current. With the controlled rectifier 33 in the blocking state, capacitor 40 will recharge to peak line voltage through the rectifier 32, resistor 39 and rectifier 34. Before the controlled rectifier 33 can again be fired, the switch 35 must be opened (contacting the resistor 36) which allows the charge on the capacitor 37 to discharge through the resistor 36.

In one construction of the embodiment illustrated in FIGURE 2, the following component values were used:

| | | |
|---|---|---|
| Resistor 36 | ohms | 1K |
| Resistor 39 | do | 270 |
| Capacitor 37 | microfarads | 0.1 |
| Capacitor 40 | do | 8 |

Being small, simple and rugged, the switch circuits illustrated in FIGURES 1 and 2 are ideally suited for use in portable electrical impact equipment. The circuits are advantageous in providing a single half-cycle of voltage because the switches are triggered during a negative half-cycle. Thus, all of the positive half-cycles of voltage will be applied to the load. Many switches known in the art are triggered by the half-cycle which is delivered to the load. Consequently, a portion of the half-cycle may be lost before the switch conducts.

The specific component values given for the two embodiments of the invention are for single half-cycle switching circuits operated with 120 volt, 60 cycles per second power sources. It is apparent that other component values can be readily established for circuits delivering more than one half-cycle of power with each triggering, or for circuits operating with power sources having different voltages or frequencies.

Although the specific embodiments employed in the specification relate to circuits illustrated in the drawing, it will be quite obvious to one skilled in the art that various adaptions, variations and modifications could be employed without departing from the spirit and scope of the invention as defined by the appended claims.

What is claimed is:

1. A switch circuit for providing a desired number of pulses comprising an alternating current source, a load, a first rectifier, a gated switch and a second rectifier, all serially connected, means for providing a gating current to said gated switch, and means for providing a holding current to said gated switch.

2. A circuit as defined by claim 1 wherein the gated switch is a controlled rectifier.

3. A switch circuit for providing a desired number of pulses comprising an alternating current source, a load, a first rectifier, a gated switch and a second rectifier, all serially connected, a switch means for providing a gating current to said gated switch, said switch means being in parallel with said first rectifier and said gated switch, and capacitive means for providing a holding current to said gated switch, said capacitive means being in parallel with said gated switch.

4. A circuit as defined by claim 3 wherein the gated switch is a controlled rectifier.

5. A switch circuit for providing a desired number of pulses comprising an alternating current source, a load, a first rectifier, a gated switch and a second rectifier, all serially connected, said first rectifier and said gated switch being shunted by a switch means and a serially connected resistor, and said gated switch being shunted by a combination comprising a first resistor in parallel with a rectifier and serially connected through a capacitor to a second resistor.

6. A circuit as defined by claim 5 wherein the gated switch is a controlled rectifier.

7. A switch circuit for providing a desired number of pulses comprising an alternating current source, a load, a first rectifier, a gated switch and a second rectifier, all serially connected, a combination including a switch means serially connected through a capacitor to a rectifier, said switch means having one position in which said capacitor is connected to a shunting resistor, said combination being in parallel with said first rectifier and said gated switch, and in parallel with said gated switch a resistor and a serially connected capacitor.

8. A circuit as defined by claim 7 wherein the gated switch is a controlled rectifier.

References Cited

UNITED STATES PATENTS

| | | | |
|---|---|---|---|
| 2,021,888 | 6/1933 | Dawson | 315—258 |
| 3,296,498 | 1/1967 | Chassanoff et al. | 307—252 |
| 3,334,243 | 8/1967 | Cooper | 307—293 |

ARTHUR GAUSS, *Primary Examiner.*

R. H. PLOTKIN, *Assistant Examiner.*